US009869366B2

(12) United States Patent
Oh et al.

(10) Patent No.: US 9,869,366 B2
(45) Date of Patent: Jan. 16, 2018

(54) APPARATUS FOR REDUCING VIBRATION FOR VEHICLES

(71) Applicant: Hyundai Motor Company, Seoul (KR)

(72) Inventors: Wan Soo Oh, Yongin-si (KR); Jang Won Lee, Yongin-si (KR); Jae Woong Hwang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 14/949,722

(22) Filed: Nov. 23, 2015

(65) Prior Publication Data

US 2017/0058992 A1 Mar. 2, 2017

(30) Foreign Application Priority Data

Aug. 24, 2015 (KR) .................... 10-2015-0118682

(51) Int. Cl.
*F16F 15/14* (2006.01)
*F16H 45/02* (2006.01)

(52) U.S. Cl.
CPC ............ *F16F 15/145* (2013.01); *F16H 45/02* (2013.01); *F16H 2045/0263* (2013.01); *F16H 2045/0294* (2013.01)

(58) Field of Classification Search
CPC ...... F16F 15/14; F16F 15/1407; F16F 15/145; F16H 45/02; F16H 2045/0263; F16H 2045/0294
See application file for complete search history.

(56) References Cited

U.S. PATENT DOCUMENTS

| 9,328,796 | B2 * | 5/2016 | Movlazada | ........... F16F 15/145 |
| 9,506,525 | B2 * | 11/2016 | Verhoog | ............... F16F 15/145 |
| 2013/0283967 | A1 | 10/2013 | Movlazada | |
| 2015/0204416 | A1 * | 7/2015 | Schnaedelbach | ..... F16F 15/145 74/574.2 |
| 2016/0281816 | A1 * | 9/2016 | Miyajima | ............. F16F 15/145 |
| 2016/0348753 | A1 * | 12/2016 | Verhoog | ............... F16F 15/145 |
| 2017/0037930 | A1 * | 2/2017 | Cailleret | ............... F16F 15/145 |

FOREIGN PATENT DOCUMENTS

| DE | 102014208868 A1 * | 12/2014 | ........... F16F 15/145 |
| DE | 102015203047 A1 * | 8/2015 | ........... F16F 15/145 |
| DE | 102004011830 B4 * | 9/2015 | ........... F16F 15/145 |
| DE | 102015205144 A1 * | 9/2016 | ........... F16F 15/133 |
| EP | 3085990 A1 * | 10/2016 | ........... F16F 15/145 |

(Continued)

OTHER PUBLICATIONS

Machine translation of DE 102004011830 B4 obtained on Apr. 17, 2017.*

(Continued)

*Primary Examiner* — Adam D Rogers
(74) *Attorney, Agent, or Firm* — Morgan, Lewis & Bockius LLP

(57) ABSTRACT

An apparatus for reducing vibration for vehicles may include discs rotated in connection with an engine rotating shaft, a plurality of masses provided at the circumferential parts of the discs, and a plurality of connection elements provided between the masses, a first end of each of the connection elements being hinged to the disc and both sides of a second end of each of the connection elements being connected to different adjacent masses.

11 Claims, 6 Drawing Sheets

(56) References Cited

FOREIGN PATENT DOCUMENTS

| | | |
|---|---|---|
| JP | 2008-163977 A | 7/2008 |
| JP | 2011-185307 A | 9/2011 |
| JP | 2013-522548 A | 6/2013 |
| JP | 2014-534396 A | 12/2014 |
| KR | 10-2002-0044218 A | 6/2002 |
| KR | 10-2006-0003532 A | 1/2006 |
| KR | 10-1431219 B1 | 8/2014 |
| WO | WO 2015149782 A1 * 10/2015 | ......... F16D 15/1421 |

OTHER PUBLICATIONS

Machine translation of WO 2015149782 A1 obtained on Apr. 21, 2017.*

* cited by examiner

APPARATUS FOR REDUCING VIBRATION FOR VEHICLES

CROSS-REFERENCE TO RELATED APPLICATION

The present application claims the priority benefit of Korean Patent Application No. 10-2015-0118682, filed Aug. 24, 2015, the disclosure of which is incorporated herein by reference.

BACKGROUND OF THE INVENTION

Field of the Invention

The present invention relates to an apparatus for reducing vibration for vehicles and, more particularly, to an apparatus for reducing vibration for vehicles which maximizes vibration reduction effects.

Description of Related Art

In general, an engine includes a plurality of cylinders and pistons, the respective pistons are connected to a crankshaft and transmit vertical reciprocation to rotation of the crankshaft, and the crankshaft is connected to a transmission and outputs driving force.

Rotation of such an engine is carried out according to reciprocation of the pistons provided by predetermined rotational angle intervals. When the pistons are reciprocated and transmit expansive force to the crankshaft, a considerable amount of torque is momentarily applied to the crankshaft and a considerable degree of vibration occurs. When such impact is repeated, the vehicle may be vibrated. Therefore, a flywheel is installed at the output side of the engine so as to prevent momentary variation of rotation of a rotating shaft and to maintain inertia of the output side of the engine.

However, all torsional vibration generated from the engine may not be controlled and, thus, conventionally, a damper to absorb torsional vibration is additionally installed between the transmission and the engine so as to reduce vibration.

Recently, as vibration of the engine is more increased due to downsizing and high-power of the engine, increased damping force has become a major issue. However, the designable size of a damper or a flywheel is restricted and, thus, damping force may not be increased by unlimitedly increasing the radius of the damper.

For this purpose, technology to increase inertial damping force by adding a centrifugal pendulum absorber (CPA) damper to a transmission has been developed now. However, since a plurality of masses provided in the conventional CPA damper is separated from each other and independently rotated, the masses are rotated in directions of facing each other or do not integrally move and may thus increase vibration or generate impact at joints.

The above description has been provided to aid in understanding of the background of the present invention and should not be interpreted as conventional technology known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for reducing vibration for vehicles in which masses and discs are connected and rotated in the same direction at all times so as to achieve constant damping effects.

In accordance with the present invention, the above and other objects can be accomplished by the provision of an apparatus for reducing vibration for vehicles, including discs rotated in connection with an engine rotating shaft, a plurality of masses provided at the circumferential parts of the discs, and a plurality of connection elements provided between the masses, one end of each of the connection elements being hinged to the disc and both sides of the other end of each of the connection elements being connected to different adjacent masses.

The connection elements may be provided in a pair so as to be connected to one surface and the other surface of each of the masses and the discs may be provided in a pair such that the masses are located between the pair of the discs.

A plurality of first connection pins may be provided so as to connect one end of each of the connection elements to the disc.

A washer may be provided between the disc and one end of each of the connection elements, and each of the first connection pins may pass through the disc, the washer and the connection element so as to connect the disc, the washer and the connection element.

An oil groove may be formed on the first connection pins.

A hole formed at one end of each of the connection elements such that the first connection pin passes through the hole may be formed in a circular shape having openings formed along the circumference thereof.

Connection parts may be formed at both ends of the masses so as to be inserted between the pair of connection elements and both sides of the other ends of the pair of connection elements may be combined with the connection parts of different masses.

A plurality of second connection pins may be provided so as to connect connection parts of the masses and the other ends of the connection elements to each other.

An oil groove may be formed on the second connection pins.

Holes formed at the other end of each of the connection elements such that the second connection pins pass through the holes may be formed in a circular shape having openings formed along the circumference thereof.

Any one of the discs in a pair may be riveted to a clutch through a coupling pin.

The connection element may have a triangular shape, and a distance from one end of the connection element to one side of the other end of the connection element may be equal to a distance from the end of the connection element to the other side of the other end of the connection element.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
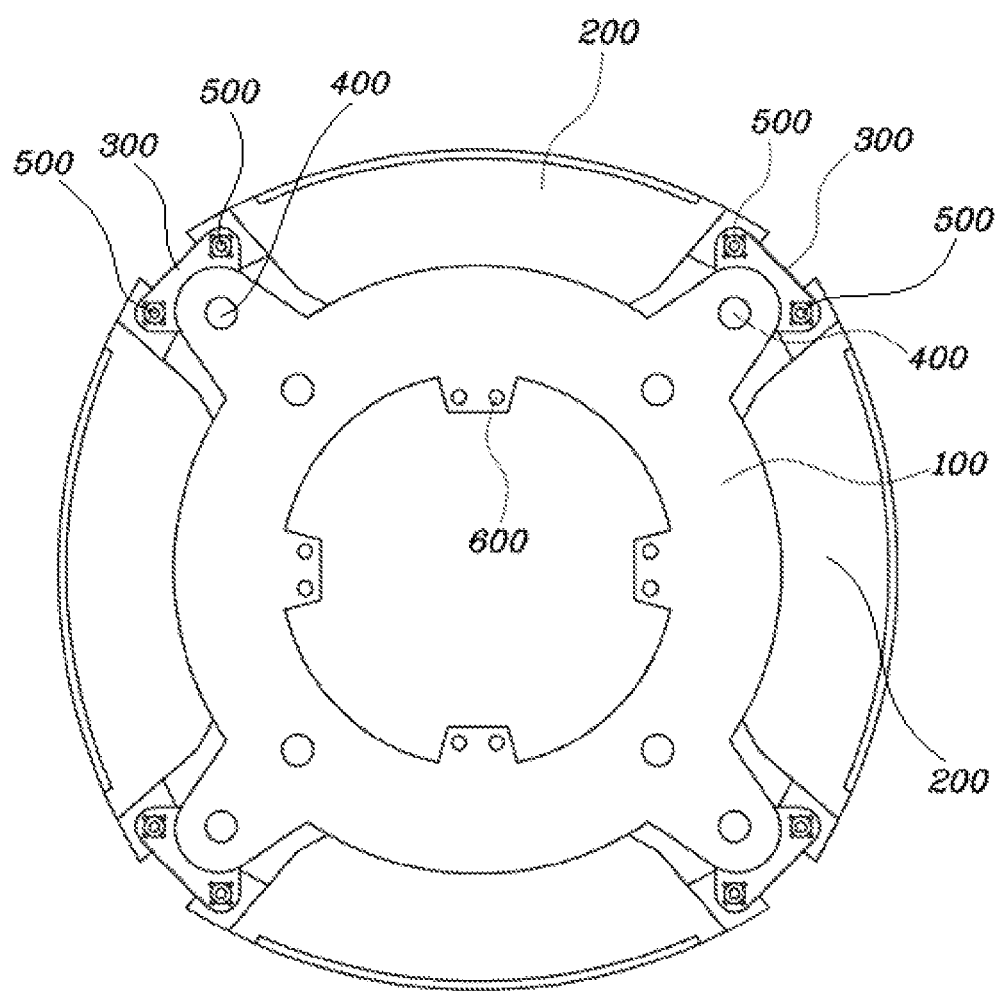
FIG. 1 is a front view of an apparatus for reducing vibration for vehicles in accordance with one embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an apparatus for reducing vibration for vehicles in accordance with one embodiment of the present invention will be described with reference to the accompanying drawings.

Figure 2:
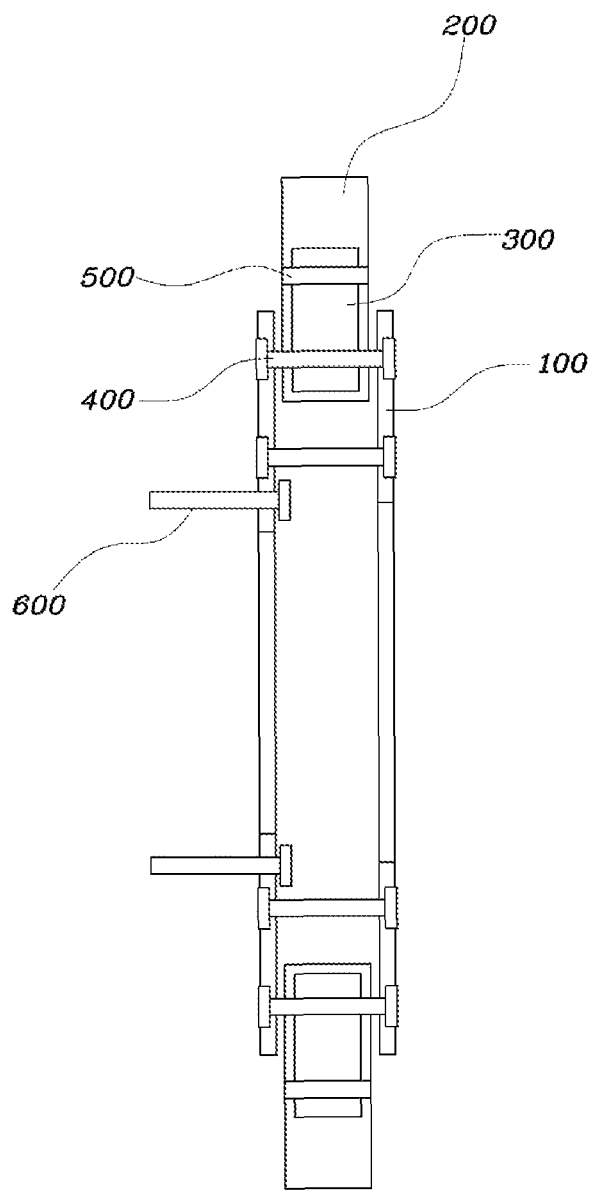
FIG. 2 is a cross-sectional view of the apparatus for reducing vibration for vehicles in accordance with one embodiment of the present invention.

FIG. 1 is a front view of an apparatus for reducing vibration for vehicles in accordance with one embodiment of the present invention and FIG. 2 is a cross-sectional view of the apparatus for reducing vibration for vehicles in accordance with one embodiment of the present invention.

The apparatus for reducing vibration for vehicles may include discs 100 rotated in connection with an engine rotating shaft 50, a plurality of masses 200 provided at the circumferential parts of the discs 100, and a plurality of connection elements 300 provided between the masses 200, one end of each of the connection elements 300 being hinged to the disc 100 and both sides of the other end of each of the connection elements 300 being connected to different adjacent masses 200.

Figure 3:
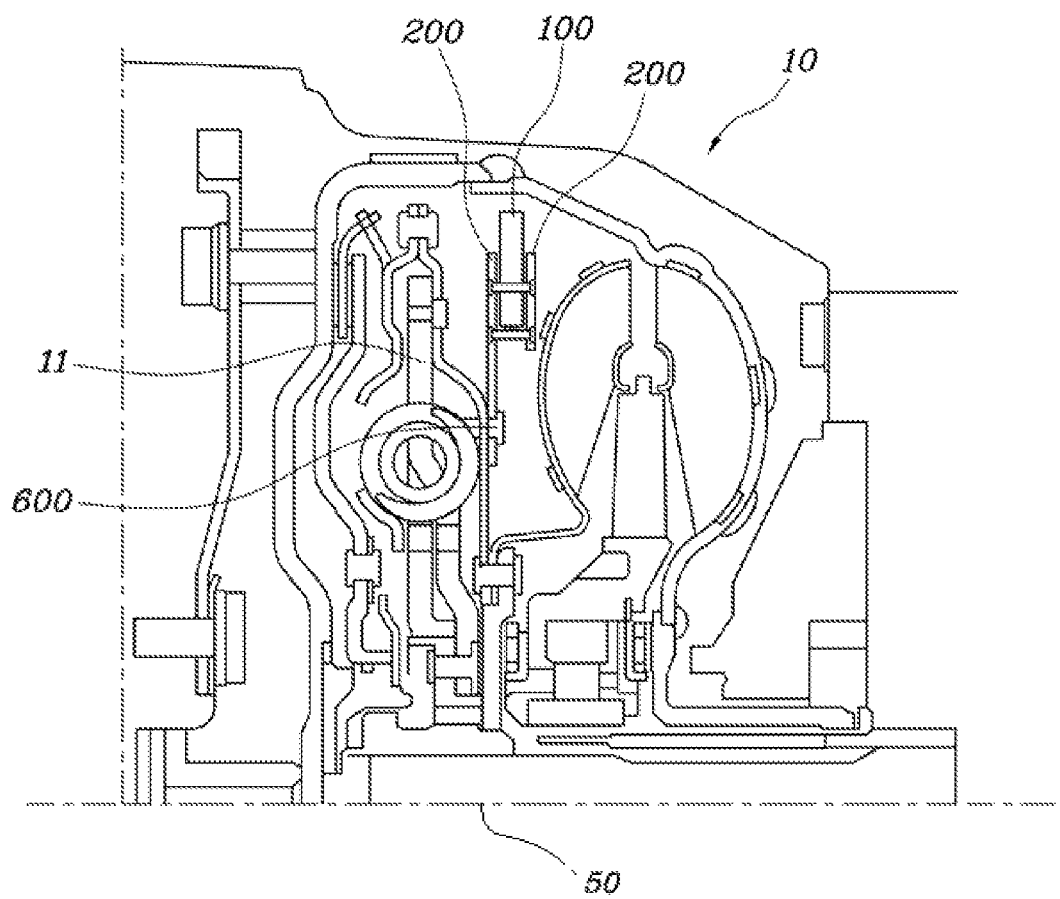
FIG. 3 is a view illustrating installation of the apparatus for reducing vibration for vehicles in a torque converter.

In more detail, FIG. 3 is a view illustrating installation of the apparatus for reducing vibration for vehicles, the discs 100 and the masses 200 may be provided within a torque converter 10, and the discs 100 may be riveted to a clutch 11 provided within the torque converter 10 through a coupling pin 600 and be rotated together with rotation of the clutch 11.

Of course, the clutch 11 may be connected to an input shaft extending from the engine so as to be rotated when the engine is rotated.

Since the discs 100 are provided within the torque converter 10 and coupled with the clutch 11, a separate space to install the discs 100 may not be required and a vacant space within the torque converter 10 may be used, thereby reducing the additional design range of the torque converter 10.

Further, as exemplarily shown in FIGS. 1 and 2, the discs 100 may be formed as a ring-shaped panel provided in the circumferential direction of the clutch 11 and the masses 200 may be panels having a predetermined length and curvature along the circumferential parts of the discs 100. Of course, the shapes of the discs 100 and the masses 200 are not limited thereto and may be variously formed according to designer's intentions.

The connection elements 300 have a triangular shape, one end of the connection element 300 is connected to the disc 100, and both sides of the other end of the connection element 300 are connected to different masses 200. Through these connection relations, when the discs 100 are rotated, all the masses 200 move in the same direction, thus preventing collision of the masses 200 and lowering of damping effects due to rotation of the masses in directions of facing each other.

Figure 4:
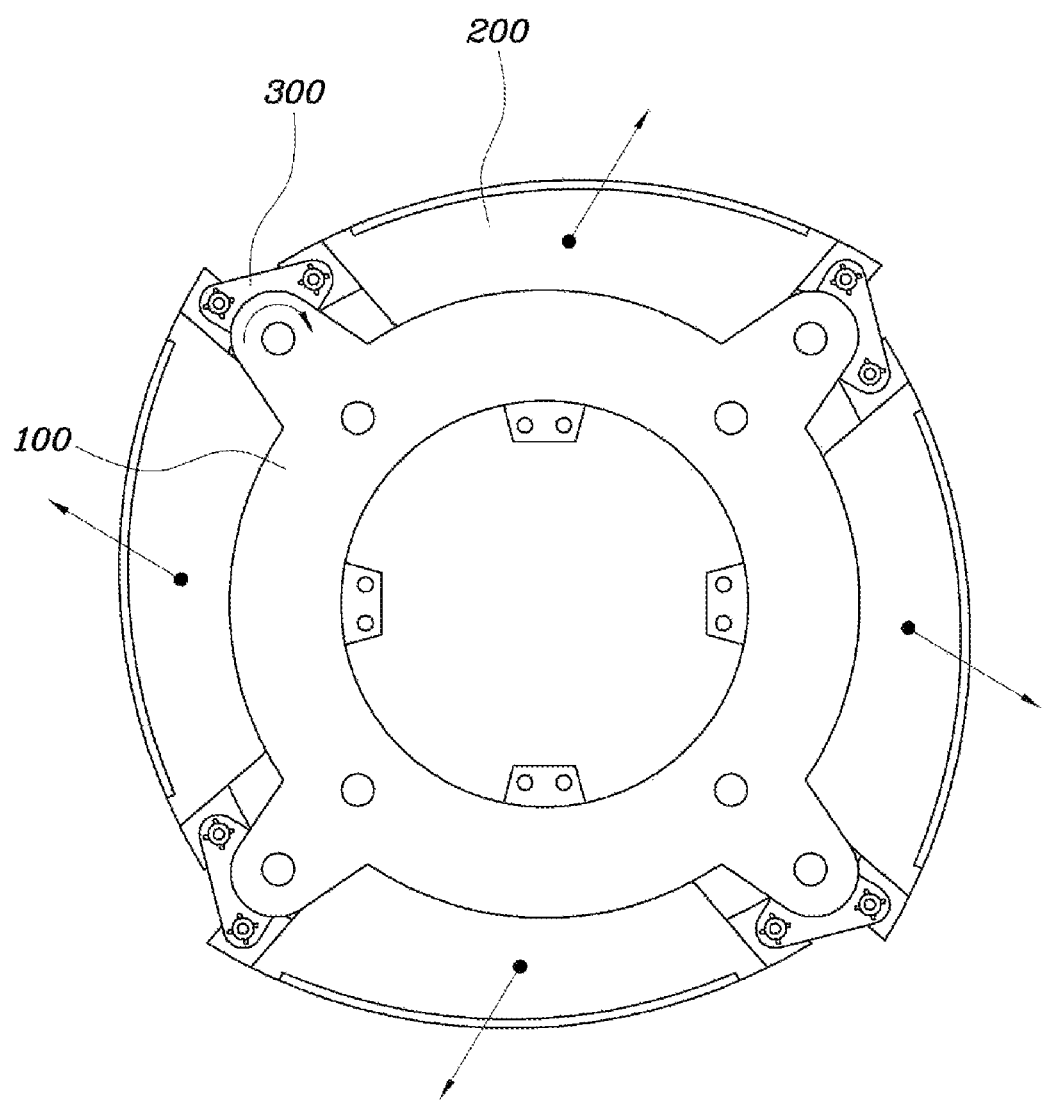
FIG. 4 is a view illustrating operation of the apparatus for reducing vibration for vehicles when an engine is rotated.

FIG. 4 is a view illustrating operation of the apparatus for reducing vibration for vehicles when the engine is rotated. Since one end of each of the connection elements 300 is hinged to the disc 100, when the discs 100 are rotated in the counterclockwise direction along the engine rotating shaft 50, the connection elements 300 are rotated in the clockwise direction based on hinge shafts thereof. Thereby, the masses 200 connected to the other end of each of the connection elements 300 move in the clockwise direction by inertia and provide damping force, thus reducing driving vibration. On the other hand, when the discs 100 are rotated in the clockwise direction along the engine rotating shaft 50, the connection elements 300 are rotated in the counterclockwise direction and the masses 200 move in the counterclockwise direction by inertia, thus providing damping force.

The connection elements 300 may be provided in a pair so as to be connected to one surface and the other surface of each of the masses 200 and the discs 100 may be provided in a pair such that the masses 200 are located between the pair of the discs 100.

Figure 5:
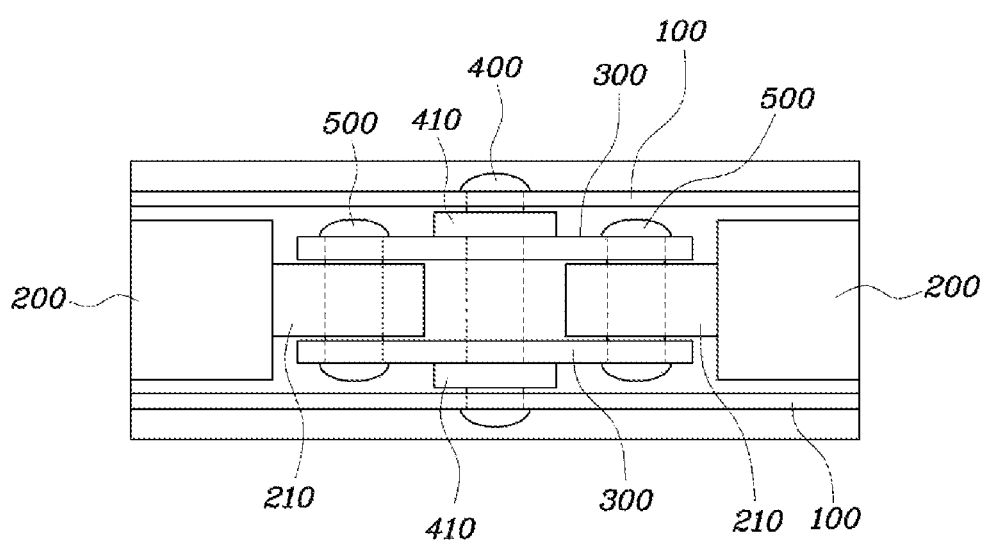
FIG. 5 is an enlarged view of the apparatus for reducing vibration for vehicles in accordance with one embodiment of the present invention.

FIG. 5 is an enlarged view of the apparatus for reducing vibration for vehicles in accordance with one embodiment of the present invention and therethrough, it may be confirmed that the masses 200 are provided between the pair of the discs 100 along the circumferences of the discs 100 and the adjacent masses 200 are inserted between both sides of the pair of the connection elements 300.

Particularly, a plurality of first connection pins 400 may be provided so as to connect one end of each of the connection elements 300 to the disc 100. In detail, since holes are formed at the circumferential parts of the discs 100 and one end of each of the connection elements 300, and the first connection pins 400 are coupled with the discs 100 and one end of each of the connection elements 300 through the corresponding holes, the connection elements 300 may be rotated about the ends thereof.

Further, as exemplarily shown in FIG. 5, a washer 410 may be provided between the disc 100 and one end of the connection element 300, and the first connection pin 400 may pass through the disc 100, the washer 410 and the connection element 300 so as to connect the disc 100, the washer 410 and the connection element.

That is, the washers 410 are provided between the connection elements 300 and the discs 100, thereby preventing the connection elements 300 or the discs 100 from moving in the radial direction by vehicle vibration and thus preventing noise and vibration.

Connection parts 210 may be formed at both ends of the masses 200 so as to be inserted between a pair of connection elements 300 and both sides of the other end of the connection element 300 may be combined with the connection parts 210 of different masses 200. That is, the connection parts 210 may be formed at both ends of the masses 200 and have a small thickness so as to be inserted between a pair of connection elements 300.

Further, a plurality of second connection pins 500 to connect the connection parts 210 of the masses 200 and the other ends of the connection elements 300 to each other may be provided.

Here, the second connection pins 500 are provided to hinge the connection parts 210 of the masses 200 to the other ends of a pair of connection elements 300, thereby moving the masses 200 in a direction of damping force according to rotation of the connection elements 300.

Figure 6:
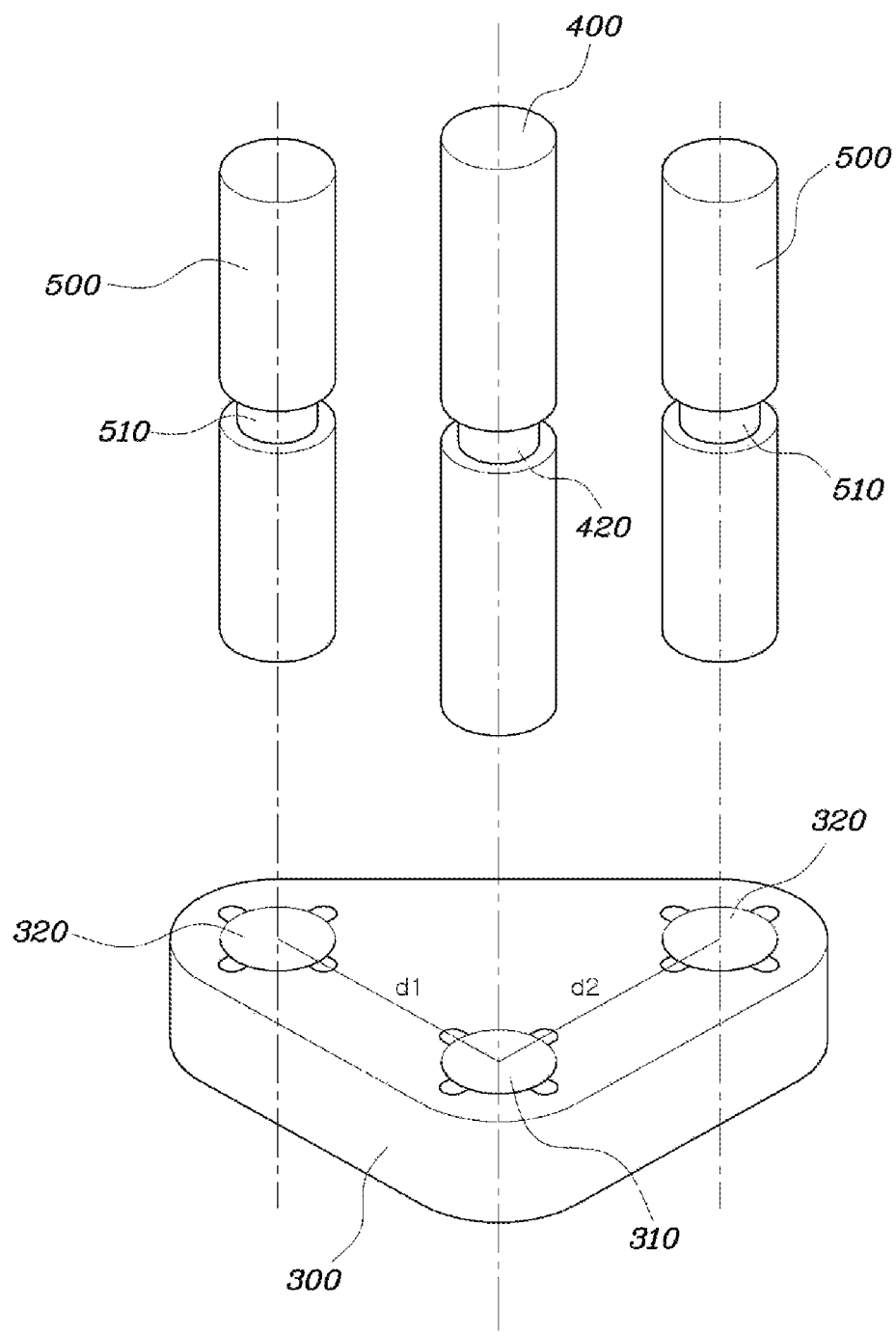
FIG. 6 is a view illustrating a connection element, a first connection pin and second connection pins.

FIG. 6 is a view illustrating the connection element 300, the first connection pin 400 and the second connection pins 500. With reference to FIG. 6, oil grooves 420 and 510 are formed on the first connection pin 400 and the second connection pins 500 and a hole 310 formed at one end of the connection element 300 such that the first connection pin 400 passes through the hole 310, and holes 320 formed at the other end of the connection element 300 such that the second connection pins 500 pass through the holes 320 are formed in a circular shape having openings formed along the circumference thereof.

That is, the first connection pin 400, the hole 310, into which the first connection pin 400 is inserted, the second connection pins 500, and the holes 320, into which the second pins 500 are inserted, have a shape in which transmission oil may flow, thus reducing friction of the first and second pins 400 and 500 when the discs 100 and the masses 200 are rotated. Therefore, abrasion of the first and second pins 400 and 500 may be prevented and lowering of damping efficiency due to friction may be reduced.

With reference to FIG. 6, a distance d1 from one end of the connection element 300 to one side of the other end of the connection element 300 may be equal to a distance d2 from the end of the connection element 300 to the other side of the other end of the connection element 300. That is, the connection element 300 is rotated about one end thereof connected to the disc 100 and the distance from one end to the other end of the connection element 300 may be equal to the radius of movement of the masses 200. Therefore, in order to facilitate movement of the masses 200 and to prevent collision between the masses 200, the distances d1 and d2 from one end to the other end of the connection element 300 may be equal.

Through the above-described configuration, the masses 200 move in the same direction by the connection elements 300 and, thus, collision between the masses 200 may be prevented. Conventionally, in order to reduce impact when masses collide with each other, a spring and a rubber bumper are added but, in an exemplary embodiment of the present invention, addition of the corresponding impact absorbing device is not required and thus manufacturing costs and package volume may be reduced.

Further, in addition to omission of the additional device, it is not necessary to secure a roller region provided in the masses, thus improving damping efficiency through maximization of the weight of masses and reducing manufacturing time and costs through omission of processing of the roller region.

As is apparent from the above description, in an apparatus for reducing vibration for vehicles having the above-described structure, masses and discs are connected to each other so as to be rotated in the same direction at all times, thereby achieving constant damping efficiency in any situation.

Further, inertial force even within a restricted space may be increased and, thus, high torsional force of a high-power vehicle may be controlled.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing vibration for a vehicle, comprising:
   discs rotated in connection with an engine rotating shaft;
   a plurality of masses provided at circumferential parts of the discs; and
   a plurality of connection elements provided between the masses, a first end of a respective one of the connection elements being hinged to the discs and both sides of a second end of the respective one of the connection elements being connected to different adjacent masses,
   wherein the connection elements are provided in a plurality of pairs to be connected to a first surface and a second surface of each of the masses; and
   wherein the discs are provided in a single pair such that the masses are located between the single pair of the discs.

2. The apparatus for reducing the vibration for the vehicle according to claim 1, wherein a plurality of first connection pins is provided to connect the first end of the respective one of the connection elements to the discs.

3. The apparatus for reducing the vibration for the vehicle according to claim 2, wherein
   a washer is provided between the discs and the first end of the respective one of the connection elements; and
   each of the first connection pins passes through the discs, the washer, and the respective one of the connecting elements to connect the discs, the washer, and the respective one of the connecting elements.

4. The apparatus for reducing the vibration for the vehicle according to claim 2, wherein an oil groove is formed on the first connection pins.

5. The apparatus for reducing the vibration for the vehicle according to claim 2, wherein a hole formed at the first end of the respective one of the connection elements such that the plurality of first connection pins pass through the hole formed at the first end of the respective one of the connection elements is formed in a circular shape having openings formed along a circumference thereof.

6. The apparatus for reducing the vibration for the vehicle according to claim 2, wherein
connection parts are formed at both ends of the masses and a respective one of the connection parts to be inserted between a respective pair of connection elements; and
both sides of second ends of each of the respective pair of connection elements are combined with the respective one of the connection parts of two adjacent masses of the plurality of masses.

7. The apparatus for reducing the vibration for the vehicle according to claim 6, wherein a plurality of second connection pins is provided to connect the connection parts of the masses and the second ends of the connection elements to each other.

8. The apparatus for reducing the vibration for the vehicle according to claim 7, wherein an oil groove is formed on the second connection pins.

9. The apparatus for reducing the vibration for the vehicle according to claim 7, wherein holes are formed at the second end of the respective one of the connection elements such that the second connection pins pass through the holes, and the holes are formed in a circular shape having openings formed along a circumference thereof.

10. The apparatus for reducing the vibration for the vehicle according to claim 1, wherein any one of the discs in the single pair is riveted to a clutch through a coupling pin.

11. The apparatus for reducing the vibration for the vehicle according to claim 1, wherein each of the plurality of connection elements has a triangular shape, and a distance from the first end of each connection element to a side of the second end of each connection element is equal to a distance from the first end of each connection element to a second side of the second end of each connection element.

* * * * *